(12) United States Patent
Schmidt

(10) Patent No.: US 8,827,671 B2
(45) Date of Patent: Sep. 9, 2014

(54) EXTRUSION AND CONDITIONING APPARATUS

(75) Inventor: Siegfried Schmidt, Verden/Aller (DE)

(73) Assignee: Mars, Inc., McLean, VA (US)

( * ) Notice: Subject to any disclaimer, the term of this patent is extended or adjusted under 35 U.S.C. 154(b) by 242 days.

(21) Appl. No.: 13/260,775

(22) PCT Filed: Jan. 13, 2010

(86) PCT No.: PCT/EP2010/000131
§ 371 (c)(1),
(2), (4) Date: Dec. 2, 2011

(87) PCT Pub. No.: WO2010/112097
PCT Pub. Date: Oct. 7, 2010

(65) Prior Publication Data
US 2012/0076884 A1    Mar. 29, 2012

(30) Foreign Application Priority Data

Mar. 30, 2009 (DE) .......................... 10 2009 015 578

(51) Int. Cl.
| | |
|---|---|
| *B29C 47/88* | (2006.01) |
| *B29C 47/34* | (2006.01) |
| *B29C 31/00* | (2006.01) |
| *A23N 17/00* | (2006.01) |
| *B29C 47/00* | (2006.01) |
| *A23P 1/12* | (2006.01) |
| *F26B 17/10* | (2006.01) |
| *B29B 9/06* | (2006.01) |
| *B29C 35/04* | (2006.01) |

(52) U.S. Cl.
CPC .................. *A23P 1/12* (2013.01); *B29C 35/049* (2013.01); *B29C 31/00* (2013.01); *A23N 17/005* (2013.01); *B29C 47/0026* (2013.01); *F26B 17/103* (2013.01); *B29B 9/06* (2013.01); *B29C 47/34* (2013.01)

USPC ................ 425/72.2; 425/68; 425/69; 425/70; 425/72.1; 425/185; 425/307; 425/308; 425/313; 425/404; 425/445

(58) Field of Classification Search
CPC ............ B29C 47/34; B29B 9/06; B29B 9/065
USPC ......... 425/67, 68, 69, 70, 184, 185, 311, 313, 425/307, 308, 310, 451.9, 72.1, 72.2, 404, 425/445
See application file for complete search history.

(56) References Cited

U.S. PATENT DOCUMENTS

| | | | |
|---|---|---|---|
| 3,230,582 A * | 1/1966 | Hoffman et al. ................. | 425/67 |
| 3,271,821 A * | 9/1966 | Street ............................. | 425/313 |
| 3,462,277 A | 8/1969 | Reinhart | |

(Continued)

FOREIGN PATENT DOCUMENTS

| | | |
|---|---|---|
| DE | 19847664 A1 | 4/2000 |
| DE | 10 2007 037 607 A1 | 2/2009 |

(Continued)

OTHER PUBLICATIONS

International Search Report Wo 2010/112097 A1, dated Jul. 6, 2010.

*Primary Examiner* — Seyed Masoud Malekzadeh
(74) *Attorney, Agent, or Firm* — Fulbright & Jaworski LLP

(57) ABSTRACT

An extrusion and conditioning apparatus, with an extruder in a conveying position, leads into a conveyor housing connected in a sealed manner to a pneumatic supply line and to a pneumatic conveyor line in which extruded material can be removed pneumatically, by means of superheated steam, via the conveyor line. The extruder can be moved from the conveying position into a bypass position, in which the extruder leads to the exterior of the conveyor housing, having a means for sealing the supply and conveyor lines and the conveyor housing from the surroundings when the extruder is in the conveying and bypass positions.

12 Claims, 3 Drawing Sheets

(56) References Cited

U.S. PATENT DOCUMENTS

| | | | |
|---|---|---|---|
| 3,493,996 A * | 2/1970 | Rohn | 425/313 |
| 3,792,950 A * | 2/1974 | Cuff | 425/313 |
| 4,099,900 A * | 7/1978 | Bradbury et al. | 425/313 |
| 4,151,241 A * | 4/1979 | Bradbury et al. | 264/142 |
| 5,505,567 A * | 4/1996 | Scott | 406/106 |
| 5,723,082 A * | 3/1998 | Mizuguchi et al. | 264/142 |
| 5,948,336 A * | 9/1999 | Yoshida et al. | 264/142 |
| 6,220,847 B1 * | 4/2001 | Yoshida et al. | 425/67 |
| 6,787,073 B1 * | 9/2004 | Tadler et al. | 264/5 |
| 6,935,855 B2 * | 8/2005 | Flarup-Knudsen | 425/4 C |
| 7,128,546 B2 * | 10/2006 | Chszaniecki et al. | 425/67 |
| 2007/0284771 A1 * | 12/2007 | Boothe et al. | 264/11 |
| 2011/0210463 A1 | 9/2011 | Schmidt et al. | |

FOREIGN PATENT DOCUMENTS

| | | |
|---|---|---|
| WO | WO-2001/72153 A1 | 10/2001 |
| WO | WO-2009/018997 A1 | 2/2009 |

* cited by examiner

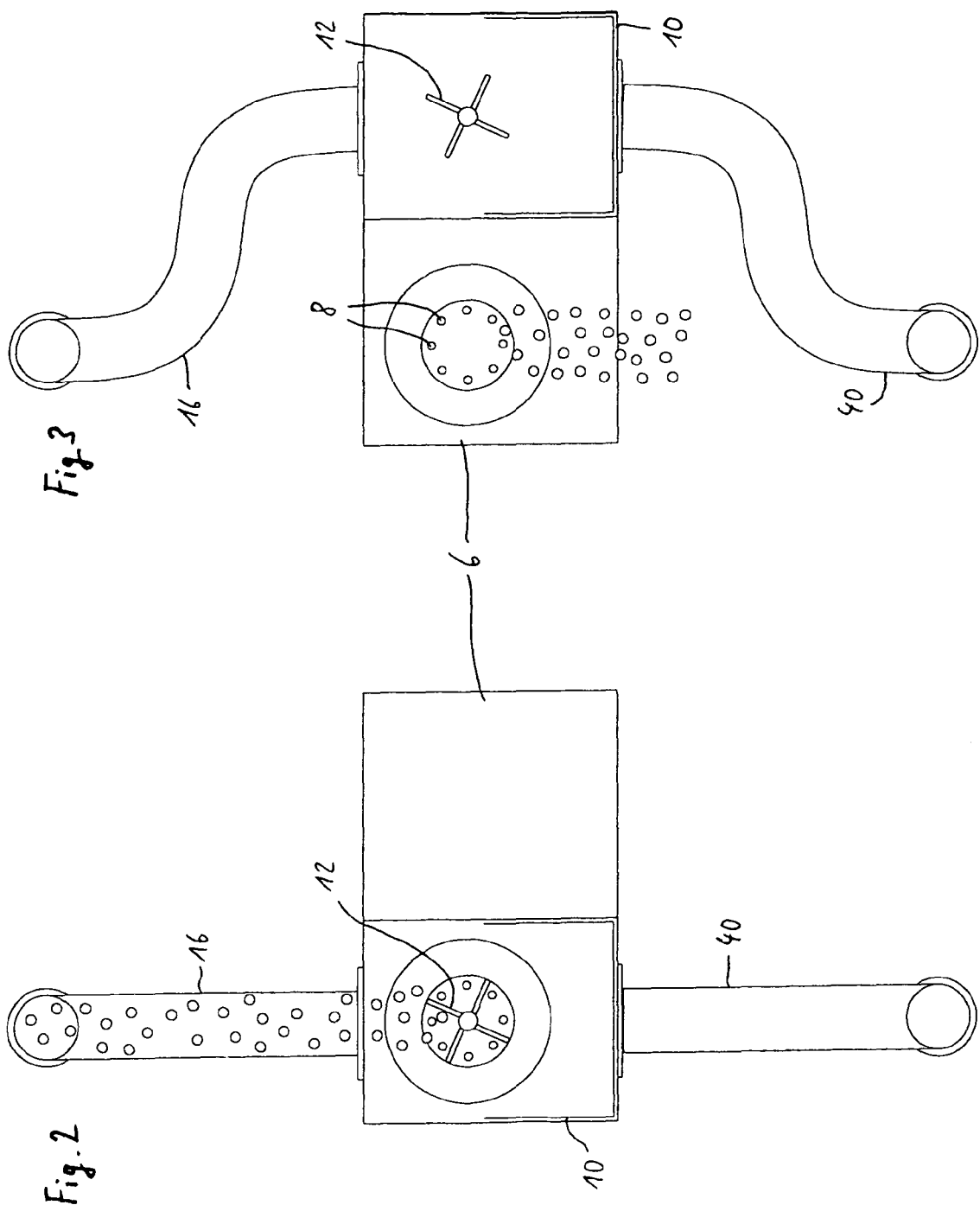

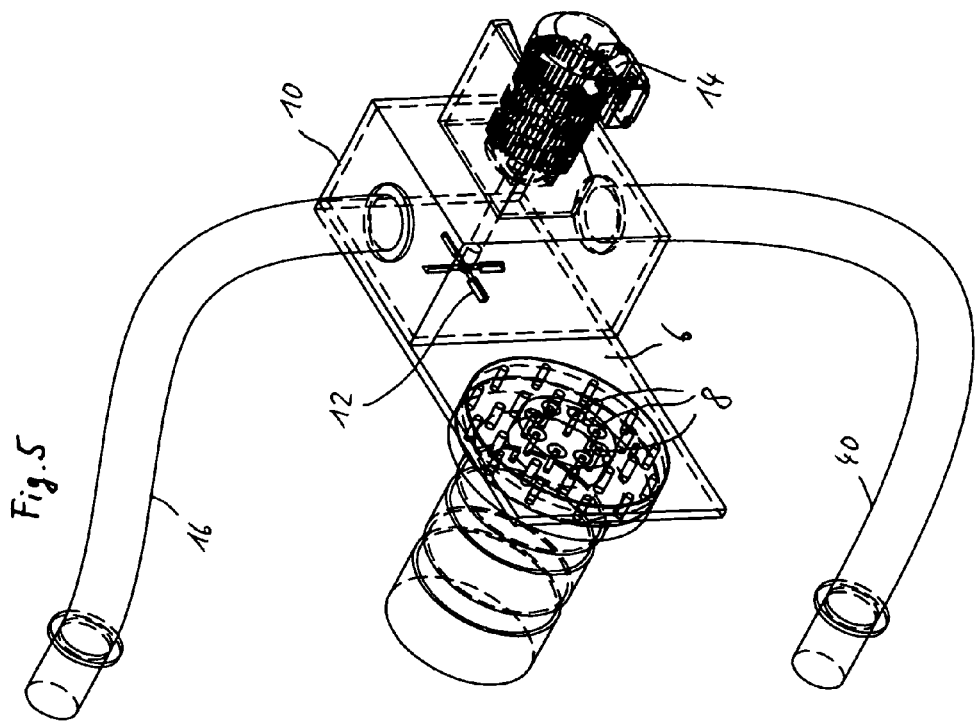
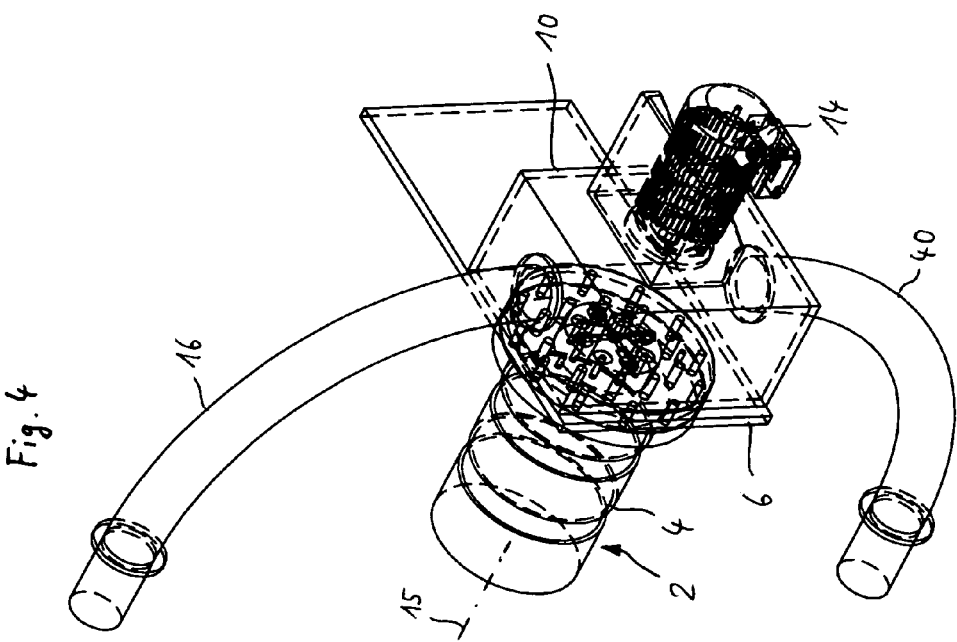

EXTRUSION AND CONDITIONING APPARATUS

CROSS-REFERENCE TO RELATED APPLICATIONS

This application is a national stage of PCT/EP2019/000131 filed on Jan. 13, 2010 claiming priority to DE 102009015578.3 filed on Mar. 30, 2009.

TECHNICAL FIELD

The invention relates to an extrusion and conditioning apparatus with an extruder which, in a conveying position, leads into a conveyor housing connected in a sealed manner to a pneumatic supply line and to a pneumatic conveyor line, from which extruded material can be removed pneumatically, especially by means of superheated steam, via the conveyor line.

BACKGROUND OF THE INVENTION

An apparatus of this kind is known from U.S. Pat. No. 5,505,567, in which a closed pneumatic conveyor circuit is provided, which extends between the conveyor housing, a centrifugal cyclone separator and a blower. Beneath the extruder, there is a flap in the conveyor housing, which can be opened if the extruder produces unwanted products, such as when starting up the extrusion process. A disadvantage here is that the flap opens up the entire system to the surroundings, as a result of which the gas used for the pneumatic transport within the system can escape, and ambient air can enter the system. A further disadvantage is that it is difficult to recover the heat released from the extruded material, since the system contains air and the moisture contained therein cannot readily be condensed.

The object of the invention consists in improving an extrusion and conditioning apparatus of this kind such that, when starting up the system, if the extruder produces unwanted product, it is ensured that the pneumatic conveyor system per se remains closed and without contact with the surroundings.

A further object consists in creating a possibility of unproblematically recovering the heat introduced into the system by the extruder.

BRIEF SUMMARY OF THE INVENTION

This object is achieved in accordance with the invention in an extrusion and conditioning apparatus of the generic kind by allowing the extruder to be moved from the conveying position into a bypass position, in which the extruder leads to the exterior of the conveyor housing, wherein the supply line is connected to the conveyor line in the conveying and bypass positions via the conveyor housing in a manner that is sealed vis-à-vis the surroundings.

In other words, the arrangement is such that the conveyor housing can be moved out of the conveying position into a bypass position, while the supply and conveyor lines and also the conveyor housing itself remain sealed vis-à-vis the surroundings at all times, so that no conveying gas can escape and no ambient air can enter. A means is present which seals the conveyor housing when the extruder is in the bypass position. This means is preferably designed such that a permanent seal between the supply line, conveyor line and conveyor housing vis-à-vis the surroundings and a connection between the supply and conveyor lines in the conveying and bypass positions of the extruder, and also in every intermediate position, is ensured.

It is envisaged that a cutter means can be disposed in the conveyor housing which, in the conveying position of the conveyor housing, co-operates with extrusion openings of the extruder. The cutter means can have a knife head which rotates in a plane of a top plate of the extruder, into which the extrusion openings open.

It is preferably proposed that the supply and conveyor lines are flexible.

The means for creating the seal can take the form of a flap or valve, or may be formed in that the top plate is extended in the direction of the bypass position, and the conveyor housing can be displaceable along the top plate, so that a sliding seal is formed.

The invention also preferably proposes that the conveyor line communicates with a centrifugal cyclone separator.

The centrifugal cyclone separator may have a product lock on the separation side, so that separated extrusion product can be transferred out in a gas-tight manner.

The centrifugal cyclone separator is preferably connected on the separation side to a dryer working with superheated steam, so that separated extrusion product can be introduced into the dryer without any contact with ambient air.

It is convenient for the supply and conveyor lines, the centrifugal cyclone separator and a blower arranged in series with it to form a closed conveyor circuit. A heat exchanger can additionally be disposed in the conveyor circuit.

In addition, it can be provided that a steam supply line leads into the conveyor circuit in order to be able to introduce superheated steam.

In addition, it may be provided that a branch line leads out of the conveyor circuit. The branch line may be provided upstream of the heat exchanger in the direction of flow, or alternatively it may be provided downstream of the heat exchanger in the direction of flow.

It can be advantageous for a steam expansion vessel to be provided in the conveyor circuit.

Operation optionally with superheated steam or with air is made possible by the fact that in a first position, upstream of the extruder when seen in the direction of flow, the conveyor circuit has a first connection point for alternatively connecting the supply line to an air delivery line and, in a second position, downstream of the extruder when seen in the direction of flow, a second connection point for alternatively connecting the conveyor line (or suction line) to an air extraction line.

BRIEF DESCRIPTION OF THE DRAWINGS

The invention will now be explained in greater detail by describing a worked embodiment, reference being made to a drawing, in which:

FIG. 2 shows part of the apparatus according to FIG. 1 in the region of the extruder in a conveying position, FIG. 3 shows a bypass position in a view corresponding to FIG. 2, and FIGS. 4 and 5 show perspective views corresponding to FIGS. 2 and 3.

DETAILED DESCRIPTION OF THE INVENTION

Figure 1:
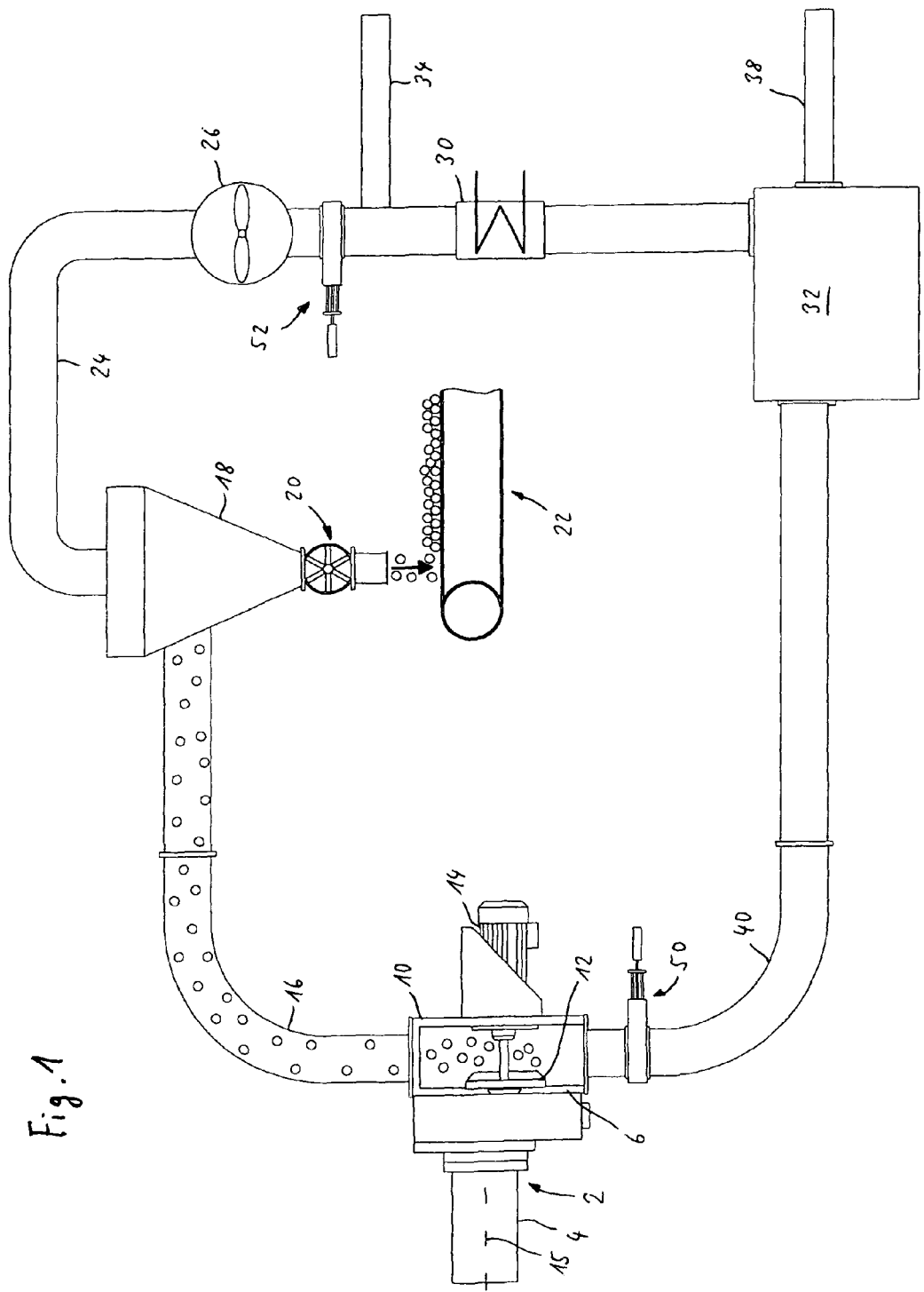
FIG. 1 shows a schematic side view of an extrusion and conditioning apparatus in accordance with the invention.

FIG. 1 shows a schematic side view of the structure of an extrusion and conditioning apparatus in accordance with the invention, An extruder 2 with an extruder housing 4 in which an extruder screw is arranged has a top plate 6 with extruder openings 8, through which the extruded product emerges. The top plate 6 terminates flush with a conveyor housing 10, in which a cutter means 12 is arranged. A drive 14 of the cutter means 12, such as a geared motor, is arranged on the outside of the conveyor housing 10.

The top plate 6 is extended transversely to an axial direction 15 of the extruder 2, and the conveyor housing 10 is displaceable in the transverse direction along the top plate 6, while maintaining the seal between the conveyor housing and the top plate, and can in this way be moved between a conveying position (FIGS. 2, 4) and a bypass position (FIGS. 3, 5). In both positions and also between them, the conveyor housing 10 in each case forms a tight seal with the top plate 6.

On a discharge side of the conveyor housing 10, on the top in the example illustrated, there is a pneumatic conveyor line 16 in the form of a flexible tube or hose, which leads to a centrifugal cyclone separator 18. The centrifugal cyclone separator 18 has a product lock 20, via which separated product to be discharged, which has been conveyed there pneumatically from the extruder, can be removed from the cyclone in a gas-tight manner, and where it lands on a conveyor belt 22.

On the suction side, the centrifugal cyclone separator 18 is connected via a suction line 24 to a blower 26, which is followed by a heat exchanger 30 and a steam expansion vessel 32.

A first branch line 34 is disposed between the blower 26 and the heat exchanger 30, and a second branch line 38 is disposed downstream of the heat exchanger 30.

A pneumatic supply line 40 in the form of a flexible tube or hose connects the steam expansion vessel 32 to the conveyor housing 10.

The conveyor housing 10 with supply and conveyor lines 40, 16 of the centrifugal cyclone separator 18 and the blower 26 arranged in series therewith in this way form a closed conveyor circuit, in which, in the embodiment illustrated, the heat exchanger 30 and the steam expansion vessel 32 are also located in addition. Furthermore, it is appropriate for a steam supply line to lead into the conveyor circuit in a suitable location, in order to be able to feed saturated or superheated steam into the conveyor circuit. The steam expansion vessel serves to compensate and buffer the amounts of steam or fluctuations in steam pressure within the conveyor circuit, e.g. because of the introduction of moisture by extruded products, the introduction of heat by means of the heat exchanger or the withdrawal of steam through a branch line.

In the arrangement illustrated in FIG. 1, the apparatus is designed for operation with supeheated steam, where the conveyor housing, all the lines and the centrifugal cyclone separator are filled with superheated steam, substantially or completely without any air or oxygen content, e.g. with less than 10%, less than 3% or less than 0.1% $O_2$. With this mode of operation, the blower 26 creates a flow in the conveyor circuit with sufficient speed to discharge the product produced by the extruder and cut into pieces by the cutter means from the conveyor housing 10 and deliver it via the pneumatic conveyor line 16 to the centrifugal cyclone separator 18, where it is separated from the flow of superheated steam and is discharged through the product lock 20.

The advantage of this mode of operation compared to the known method of conveying with the aid of a current of air consists in the fact that the steam released directly during the extrusion process and also the moisture gradually emerging from the product in the course of the further transport are absorbed by the superheated steam, which is at a temperature of more than 100° C., such as 140° to 150° C. Since there is no mixing with air, the energy contained in the steam emerging from the product can be recovered in a simple manner by diverting part of the flow of steam circulating in the conveyor circuit and condensing it for example, or recovering it thermally in some other way. A partial stream of superheated steam which has been diverted can, for example, be compressed and raised in this way to a higher energy level and put to a special use, such as in the context of absorption cooling.

Since it is advantageous for there to be no air within the conveyor circuit, the displaceable arrangement of the conveyor housing 10 on the top plate 6 is convenient, because it makes it possible to switch over between the conveying position and the bypass position without having to interrupt the circulating flow of steam and without air entering the conveyor circuit or steam escaping from it.

In order to ensure that air does not penetrate after all because of some slight local leak, it can be provided that a slight overpressure is maintained in the conveyor circuit in operation, such as 10, 20, 50, 100 or even 200 mbar above ambient pressure.

A further advantage of operating with superheated steam consists in the fact that no unwanted drop in the temperature of the product occurs when it emerges from the extruder, which would easily be the case if it entered an atmosphere of air.

In order to improve the flexibility of the apparatus, in a first position in the conveyor circuit, a first connection point 50 is present for alternatively providing a connection to an air delivery line and, in a second position, a second connection point 52 is present for alternatively providing a connection to an air extraction line. In these positions, the conveyor circuit can be split, and in the first position, upstream of the conveyor housing 10, an air delivery line can be connected to the supply line 40, and in the second position, downstream of the centrifugal cyclone separator, an air extraction line can be connected to the conveyor line 16 or suction line 24, so that instead of the flow of superheated steam, a flow of air serves to convey the extruded products, which may be appropriate for certain applications.

Even though, in the embodiment illustrated, the supply line 40 leads vertically from below into the conveyor housing, and the conveyor line 16 leads out vertically upwards, so that the extruded products are transported out against the direction of gravity, the arrangement of the directions of the supply line and conveyor line is at the discretion of the designer. It may, for example, be provided that the supply and conveyor lines are connected horizontally to the conveyor housing, or that the opposite of the embodiment illustrated is chosen and the supply line comes from above and the conveyor line goes downwards. The latter has the advantage that the force of gravity can be exploited directly in order to accelerate the extruded products to a desired conveying speed, in addition to the accelerating effect of the flowing transport medium (air, superheated steam or a mixture of the two).

LIST OF REFERENCE NUMERALS

2 Extruder
4 Extruder housing
6 Top plate
8 Extruder opening
10 Conveyor housing 12 Cutter means
14 Drive motor
15 Extruder axis
16 Pneumatic conveyor line
18 Centrifugal cyclone separator
20 Product lock
22 Conveyor belt
24 Suction line
26 Blower
30 Heat exchanger
32 Steam expansion vessel
34 First branch line
38 Second branch line
40 Pneumatic supply line
50 First connection point
52 Second connection point

What is claimed is:

1. An extrusion and conditioning apparatus comprising:
a conveyor housing having a conveyor line, a centrifugal cyclone separator, a blower and a supply line arranged in series within a circuit with the conveyor housing to form a closed conveyor circuit filled with superheated steam at a temperature of more than 100° C. whereby the superheated steam absorbs moisture as the moisture gradually emerges from an extruded product within the closed conveyor circuit;
an extruder having a plate abutting the conveyor housing, the conveyor housing being displaceable in a transverse direction along the plate, whereby a seal is maintained when the conveyor housing is moved between a conveying position and a bypass position on the plate without having to interrupt a circulating flow of steam and without air entering the conveyor circuit or steam escaping from the conveyor circuit;
whereby extruded material is removed by means of superheated steam via the conveyor line and the conveyor line communicates with a centrifugal cyclone separator for discharging an extruded product; and
the plate prevents ambient air from entering the closed conveyor circuit and steam escaping from the closed conveyor circuit when the conveyor housing is moved between the conveying position and the bypass position in order to remove material from the extruder in the bypass position.

2. The apparatus as claimed in claim 1, wherein a cutter means is disposed in the conveyor housing which, in the conveying position of the conveyor housing, co-operates with extrusion openings of the extruder.

3. The apparatus as claimed in claim 2, wherein the cutter means has a knife head which rotates in a plane of the plate of the extruder, into which the extrusion openings open.

4. The apparatus as claimed in claim 1, wherein the centrifugal cyclone separator has a product lock on a separation side.

5. The apparatus as claimed in claim 1, wherein the centrifugal cyclone separator is connected on a separation side to a dryer working with the superheated steam.

6. The apparatus as claimed in claim 1, wherein a heat exchanger is disposed in the conveyor circuit.

7. The apparatus as claimed in claim 1, wherein a steam supply line leads into the conveyor circuit.

8. The apparatus as claimed in claim 1, wherein a branch line leads out of the conveyor circuit.

9. The apparatus as claimed in claim 8, wherein the branch line is disposed upstream of the heat exchanger in a direction of flow.

10. The apparatus as claimed in claim 8, wherein the branch line is disposed downstream of the heat exchanger in a direction of flow.

11. The apparatus as claimed in claim 1, wherein a steam expansion vessel is disposed in the closed conveyor circuit.

12. The apparatus as claimed in claim 1, wherein in a first position, upstream of the extruder, the closed conveyor circuit has a first connection point for alternatively connecting the supply line to an air delivery line and, in a second position, downstream of the extruder, the closed conveyor circuit has a second connection point for alternatively connecting the conveyor line to an air extraction line.

* * * * *